United States Patent
Minami et al.

(10) Patent No.: US 10,096,864 B2
(45) Date of Patent: Oct. 9, 2018

(54) NON-AQUEOUS ELECTROLYTE SECONDARY BATTERY

(71) Applicant: SANYO ELECTRIC CO., LTD., Daito-shi, Osaka (JP)

(72) Inventors: Keisuke Minami, Hyogo (JP); Toyoki Fujihara, Hyogo (JP); Toshiyuki Nohma, Hyogo (JP)

(73) Assignee: SANYO ELECTRIC CO., LTD., Daito-shi (JP)

( * ) Notice: Subject to any disclaimer, the term of this patent is extended or adjusted under 35 U.S.C. 154(b) by 367 days.

(21) Appl. No.: 14/900,478

(22) PCT Filed: Jun. 10, 2014

(86) PCT No.: PCT/JP2014/003084
§ 371 (c)(1),
(2) Date: Dec. 21, 2015

(87) PCT Pub. No.: WO2015/001717
PCT Pub. Date: Jan. 8, 2015

(65) Prior Publication Data
US 2016/0156070 A1    Jun. 2, 2016

(30) Foreign Application Priority Data

Jul. 1, 2013 (JP) ................... 2013-137937
Jul. 1, 2013 (JP) ................... 2013-137938
Jul. 1, 2013 (JP) ................... 2013-137939

(51) Int. Cl.
*H01M 10/42* (2006.01)
*H01M 10/0587* (2010.01)
(Continued)

(52) U.S. Cl.
CPC ......... *H01M 10/425* (2013.01); *H01M 2/263* (2013.01); *H01M 2/34* (2013.01);
(Continued)

(58) Field of Classification Search
None
See application file for complete search history.

(56) References Cited

U.S. PATENT DOCUMENTS 5,427,875 A     6/1995  Yamamoto et al.
7,255,965 B2 *  8/2007  Xu ................... H01M 10/0525
                                                    429/217
(Continued)

FOREIGN PATENT DOCUMENTS

CN    101626978 A    1/2010
CN    102007623 A    4/2011
(Continued)

OTHER PUBLICATIONS

International Search Report dated Sep. 16, 2014, issued in counterpart International Application No. PCT/JP2014/003084 (2 pages).
(Continued)

*Primary Examiner* — Rena Dye Cronin
(74) *Attorney, Agent, or Firm* — Westerman, Hattori, Daniels & Adrian, LLP

(57) ABSTRACT

A nonaqueous electrolyte secondary battery includes a pressure-sensitive current interrupt mechanism, and a flat wound electrode body that is inserted in an outer casing with a winding axis of the flat wound electrode body arranged to extend in a horizontal direction. A positive electrode plate, a negative electrode plate, and a separator in a winding end portion of the flat wound electrode body are all directed toward a top side.

12 Claims, 4 Drawing Sheets

(51) Int. Cl.
  *H01M 10/0525* (2010.01)
  *H01M 2/34* (2006.01)
  *H01M 4/13* (2010.01)
  *H01M 4/62* (2006.01)
  *H01M 2/26* (2006.01)
  *H01M 10/052* (2010.01)
  *H01M 10/0567* (2010.01)
  *H01M 2/02* (2006.01)

(52) U.S. Cl.
  CPC ............... *H01M 4/13* (2013.01); *H01M 4/62* (2013.01); *H01M 10/052* (2013.01); *H01M 10/0567* (2013.01); *H01M 10/0587* (2013.01); *H01M 2/024* (2013.01); *H01M 10/0525* (2013.01); *H01M 2200/20* (2013.01); *H01M 2220/20* (2013.01); *Y02E 60/122* (2013.01); *Y02T 10/7011* (2013.01)

(56) References Cited

U.S. PATENT DOCUMENTS

| | | | |
|---|---|---|---|
| 2004/0121239 A1 | 6/2004 | Abe et al. | |
| 2007/0048613 A1* | 3/2007 | Yanagida | H01M 4/66 429/245 |
| 2008/0050658 A1 | 2/2008 | Abe et al. | |
| 2008/0182175 A1 | 7/2008 | Okazaki et al. | |
| 2010/0015514 A1 | 1/2010 | Miyagi et al. | |
| 2010/0099031 A1* | 4/2010 | Kato | H01M 10/052 429/330 |
| 2010/0209757 A1* | 8/2010 | Ooyama | H01M 2/1653 429/144 |
| 2011/0039160 A1 | 2/2011 | Takahata et al. | |
| 2012/0107652 A1* | 5/2012 | Iyori | H01M 2/263 429/61 |
| 2012/0145428 A1* | 6/2012 | Tokunaga | H01M 10/0431 173/217 |
| 2012/0244425 A1* | 9/2012 | Tokuda | H01M 4/5825 429/199 |
| 2013/0022861 A1 | 1/2013 | Miyagi et al. | |
| 2013/0052500 A1* | 2/2013 | Nonaka | H01M 2/0237 429/94 |
| 2014/0234701 A1 | 8/2014 | Tanaka et al. | |
| 2014/0242430 A1* | 8/2014 | Takahata | H01M 10/0567 429/61 |
| 2014/0322579 A1 | 10/2014 | Mitsuhashi et al. | |
| 2015/0243936 A1 | 8/2015 | Miyagi et al. | |
| 2015/0325838 A1* | 11/2015 | Tamaki | H01M 4/505 429/94 |

FOREIGN PATENT DOCUMENTS

| | | |
|---|---|---|
| CN | 102468488 A | 5/2012 |
| JP | 4-328278 A | 11/1992 |
| JP | 5-62664 A | 3/1993 |
| JP | 10-302774 A | 11/1998 |
| JP | 2000-149924 A | 5/2000 |
| JP | 2006-286337 A | 10/2006 |
| JP | 2007-165294 A | 6/2007 |
| JP | 2007-179883 A | 7/2007 |
| JP | 2008-186792 A | 8/2008 |
| JP | 2009-259604 A | 11/2009 |
| JP | 2009-259804 A | 11/2009 |
| JP | 2012-190714 A | 10/2012 |
| JP | 2013-84547 A | 3/2013 |
| JP | 2013-98099 A | 5/2013 |
| JP | 2013-109866 A | 6/2013 |
| WO | 02/059999 A1 | 8/2002 |
| WO | 2013/076847 A1 | 5/2013 |

OTHER PUBLICATIONS

English translation of Search Report dated Dec. 23, 2016, issued in counterpart Chinese Application No. 201480036029.3. (1 page).

* cited by examiner

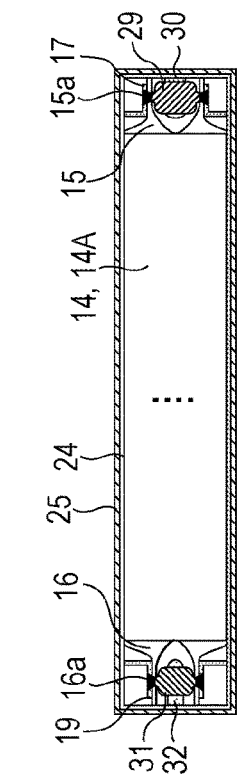
Figure 2C
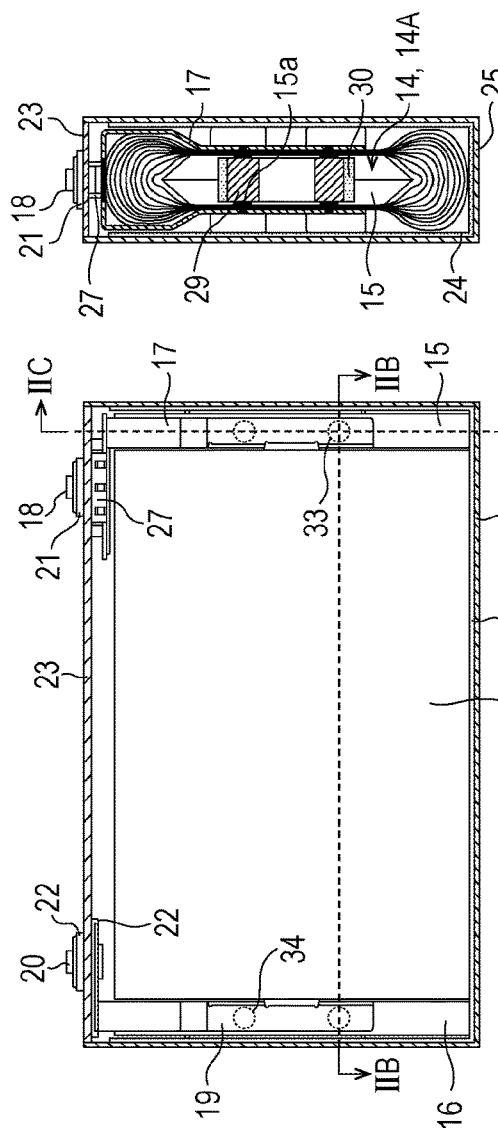
Figure 2A
Figure 2B
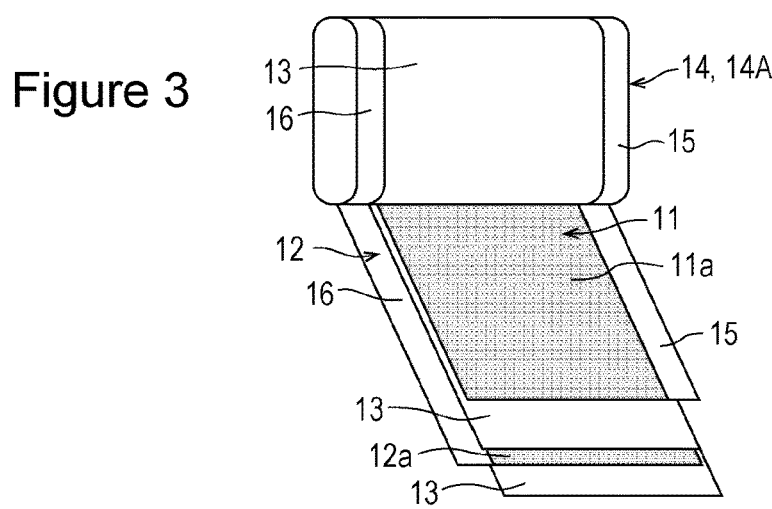
Figure 3

NON-AQUEOUS ELECTROLYTE SECONDARY BATTERY

TECHNICAL FIELD

The present invention relates to a nonaqueous electrolyte secondary battery.

BACKGROUND ART

A vehicle-equipped nonaqueous electrolyte secondary battery used in, e.g., a power supply for driving an electric vehicle (EV) or a hybrid electric vehicle (HEV or PHEV) includes a pressure-sensitive current interrupt mechanism in addition to a safety valve for the prevention of explosion. The pressure-sensitive current interrupt mechanism is operated with gas that is quickly generated inside the battery in an abnormal state. The pressure-sensitive current interrupt mechanism is provided to interrupt a current that is going to flow toward the outside, and to prevent a burst of the battery or firing.

In the nonaqueous electrolyte secondary battery, raising a charging voltage is known as one of methods for increasing the battery capacity. As a safety measure in consideration of the event of an overcharge state of the nonaqueous electrolyte secondary battery, it is also known to add, into a nonaqueous electrolytic solution, one or more overcharge inhibitors such as tert-amylbenzene and/or biphenyl (see Patent Literature (PTL) 1), or a cycloalkyl benzene compound and/or a compound having quarternary carbon adjacent to a benzene ring (see PTL 2). However, raising the charging voltage to increase the battery capacity accompanies with a risk that the overcharge inhibitor may be decomposed even at a voltage, which is set within the range for ordinary use, depending on the type of the overcharge inhibitor, and that battery characteristics and safety may degrade after charge and discharge cycles.

From the viewpoint of solving the above-mentioned problem, it is further known to improve overcharge tolerance by adding lithium carbonate ($Li_2CO_3$) to a positive electrode mixture of the nonaqueous electrolyte secondary battery (see PTL 3). When lithium carbonate is added to the positive electrode mixture of the nonaqueous electrolyte secondary battery, carbon dioxide is generated from a positive electrode plate upon application of a high voltage to the battery, e.g., in the event of overcharge. As a result, the pressure-sensitive current interrupt mechanism can be caused to operate reliably with the generated carbon dioxide at earlier timing than the operation of the safety valve for the prevention of explosion.

CITATION LIST

Patent Literatures

PTL 1: International Publication No. 2002/059999
PTL 2: Japanese Published Unexamined Patent Application No. 2008-186792
PTL 3: Japanese Published Unexamined Patent Application No. 04-328278

SUMMARY OF INVENTION

Technical Problem

The nonaqueous electrolyte secondary battery includes a wound electrode body in which a positive electrode plate and a negative electrode plate are wound in a state insulated from each other with a separator interposed between both the plates. In nonaqueous electrolyte secondary batteries equipped in vehicles and having large sizes, the wound electrode body being flat in shape is used in a state arranged inside an outer casing with a winding axis of the wound electrode body extending in a horizontal direction. In some of those nonaqueous electrolyte secondary batteries, the wound electrode body is arranged inside the outer casing such that a winding end portion of the positive electrode plate is directed toward a bottom surface of the outer casing.

In the above-mentioned type of nonaqueous electrolyte secondary battery, when lithium carbonate is contained in a positive electrode mixture layer, carbon dioxide generated from the positive electrode plate rises within the flat wound electrode body toward the top side, and further moves toward the outside of the flat wound electrode body along a direction of the winding axis. When the winding end portion of the positive electrode plate is directed toward the bottom surface of the outer casing, carbon dioxide generated from an outermost positive electrode mixture layer also rises within the flat wound electrode body toward the top side. Accordingly, in some cases, the generated carbon dioxide stagnates on the outermost positive electrode surface, thereby stopping discharge and hence stopping the generation of carbon dioxide in some regions. As a result, the pressure-sensitive current interrupt mechanism becomes hard to operate promptly.

Thus, the nonaqueous electrolyte secondary battery constituted as described above has a problem that, even when the nonaqueous electrolyte secondary battery comes into an overcharge state, there is a possibility that the current interrupt mechanism may fail to operate promptly. Moreover, because the nonaqueous electrolyte secondary battery equipped in the vehicle is much larger in size than that for use in a portable device, the above-mentioned problem occurs more significantly.

Solution to Problem

A nonaqueous electrolyte secondary battery according to one aspect of the present invention includes:

a positive electrode plate including a positive electrode mixture layer formed on a positive electrode core;

a negative electrode plate including a negative electrode mixture layer formed on a negative electrode core;

a flat wound electrode body in which the positive electrode plate and the negative electrode plate are wound into a flat roll shape in a state insulated from each other with a separator interposed between the positive electrode plate and the negative electrode plate;

a nonaqueous electrolyte; and an outer casing, wherein a positive electrode core exposed portion is formed in a form of wound multilayers in one end portion of the flat wound electrode body, a negative electrode core exposed portion is formed in a form of wound multilayers in the other end portion of the flat wound electrode body, the wound multilayers of the positive electrode core exposed portion are bundled and connected to a positive electrode current collector, the wound multilayers of the negative electrode core exposed portion are bundled and connected to a negative electrode current collector, the nonaqueous electrolyte secondary battery includes a pressure-sensitive current interrupt mechanism electrically connected to at least one of the positive electrode current collector and the negative electrode current collector, the positive electrode mixture layer contains lithium carbonate, the flat wound electrode body is inserted in the outer casing with a winding axis of the flat wound electrode body arranged to extend in a horizontal direction, and the positive electrode plate, the negative electrode plate, and the separator in a winding end portion of the flat wound electrode body are all directed toward a top side.

Advantageous Effects of Invention

In the nonaqueous electrolyte secondary battery according to one aspect of the present invention, since the positive electrode plate, the negative electrode plate, and the separator in the winding end portion of the flat wound electrode body are all directed toward the top side, part of carbon dioxide generated from the positive electrode plate in the winding end portion thereof rises toward the top side and immediately moves to the outside of the flat wound electrode body. The term "top side" used in the present invention implies an upward direction perpendicular to a horizontal plane when the nonaqueous electrolyte secondary battery is arranged with the winding axis of the flat wound electrode body being parallel to the horizontal plane. With the nonaqueous electrolyte secondary battery according to one aspect of the present invention, therefore, part of the carbon dioxide generated from the outermost positive electrode plate is less likely to stagnate within the flat wound electrode body, and an amount of the generated carbon dioxide can be increased. As a result, the pressure-sensitive current interrupt mechanism can be promptly and reliably operated before the pressure inside the battery rises excessively, and very high stability is ensured in the event of overcharge.

BRIEF DESCRIPTION OF DRAWINGS

FIG. 2A is a partial sectional view taken along a line IIA-IIA in FIG. 1A, FIG. 2B is a partial sectional view taken along a line IIB-IIB in FIG. 2A, and FIG. 2C is a sectional view taken along a line IIC-IIC in FIG. 2A.

FIG. 3 is a perspective view of a flat wound electrode body, which is common to both the embodiment and the comparative example, in a state where the winding end side of the flat wound electrode body is a developed.

DESCRIPTION OF EMBODIMENT

Figure 1A:
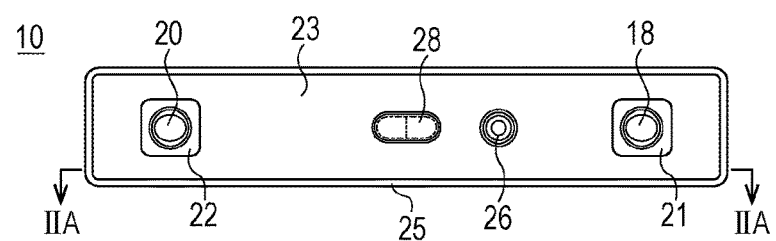
FIG. 1A is a plan view of a nonaqueous electrolyte secondary battery representing an embodiment and a comparative example.

An embodiment of the present invention will be described in detail below with reference to the drawings. It is to be noted that the following embodiment is disclosed merely illustrative for understanding of the technical concept of the present invention and is not intended to restrict the scope of the present invention to the following embodiment. The present invention can be similarly applied to a variety of cases that are modified without departing from the technical concept defined in Claims.

[Nonaqueous Electrolyte Secondary Battery of Embodiment and Comparative Example]

To begin with, the constitution of a nonaqueous electrolyte secondary battery common to both an embodiment and a comparative example is described below with reference to FIGS. 1 to 3. As illustrated in FIG. 3, the nonaqueous electrolyte secondary battery 10 includes a flat wound electrode body 14 (embodiment) or 14A (comparative example) in which a positive electrode plate 11 and a negative electrode plate 12 are wound in a state insulated from each other with a separator 13 interposed between both the plates. An outermost surface of the flat wound electrode body 14 or 14A is covered with the separator 13, while the negative electrode plate 12 is positioned on the side closer to an outer periphery than the positive electrode plate 11.

The positive electrode plate 11 includes a positive electrode mixture layer 11a formed on each of both surfaces of a positive electrode core, which is made of an aluminum or aluminum alloy foil having a thickness of about 10 to 20 µm, in such a state that the positive electrode core is exposed in a band-like shape along one end of the positive electrode core in a widthwise direction thereof. A portion of the positive electrode core where the core is exposed in the band-like shape is a positive electrode core exposed portion 15. The negative electrode plate 12 includes a negative electrode mixture layer 12a formed on each of both surfaces of a negative electrode core, which is made of a copper or copper alloy foil having a thickness of about 5 to 15 µm, in such a state that the negative electrode core is exposed in a band-like shape along one end of the negative electrode core in a widthwise direction thereof. A portion of the negative electrode core where the core is exposed in the band-like shape is a negative electrode core exposed portion 16. The positive electrode core exposed portion 15 and the negative electrode core exposed portion 16 may be formed along both ends of the positive electrode plate 11 and the negative electrode plate 12 in the widthwise direction thereof, respectively.

The flat wound electrode body 14 or 14A is fabricated by winding the positive electrode plate 11 and the negative electrode plate 12 into a flat roll shape in a state insulated from each other with the separator 13 interposed between both the plates, while positioning the positive electrode core exposed portion 15 and the negative electrode core exposed portion 16 to be deviated such that each core exposed portion does not overlap the mixture layer of the opposing electrode plate. The difference in concrete constitution between the flat wound electrode body 14 of the embodiment and the flat wound electrode body 14A of the comparative example will be described later.

As illustrated in FIGS. 2A, 2B and 3, the flat wound electrode body 14 or 14A includes the positive electrode core exposed portion 15 in the form of laminated multilayers at one end thereof, and the negative electrode core exposed portion 16 in the form of laminated multilayers at the other end thereof. As the separator 13, a micro-porous film made of, preferably, polyolefin is used in such a manner that two sheets are arranged one above the other, or that one sheet having a long size is folded. The separator 13 used here has a width being enough to cover the positive electrode mixture layer 11a and being larger than that of the negative electrode mixture layer 12a.

The positive electrode core exposed portion 15 in the form of laminated multilayers is electrically connected to a positive electrode terminal 18 through a positive electrode current collector 17. A current interrupt mechanism 27 operating in response to the pressure of gas generated inside the battery is disposed between the positive electrode current collector 17 and the positive electrode terminal 18. The negative electrode core exposed portion 16 in the form of laminated multilayers is electrically connected to a negative electrode terminal 20 through a negative electrode current collector 19.

Figure 1B:
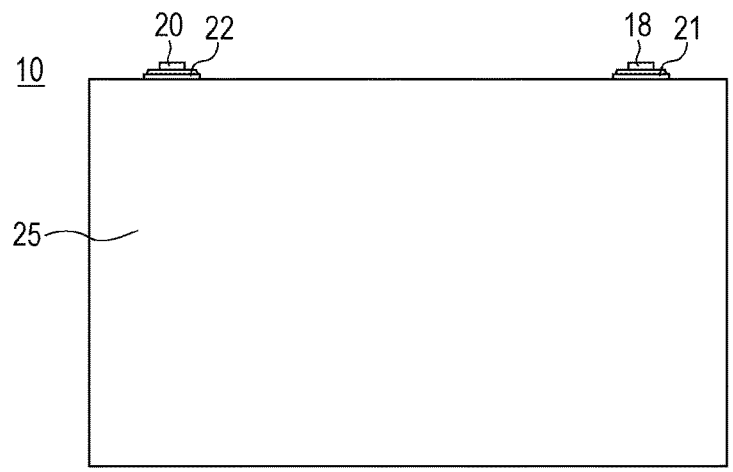
FIG. 1B is a front view of the nonaqueous electrolyte secondary battery.

As illustrated in FIGS. 1A, 1B and 2A, the positive electrode terminal 18 and the negative electrode terminal 20 are fixed to an opening sealing member 23 with insulating members 21 and 22 interposed therebetween, respectively. A gas discharge valve 28 is also disposed in the opening sealing member 23, the gas discharge valve 28 being opened in response to application of gas pressure higher than the operating pressure of the current interrupt mechanism 27. The positive electrode current collector 17, the positive electrode terminal 18, and the opening sealing member 23 are each made of aluminum or an aluminum alloy. The negative electrode current collector 19 and the negative electrode terminal 20 are each made of copper or a copper alloy.

The flat wound electrode body 14 or 14A is inserted within a rectangular outer casing 25 that is opened at one side, while an insulating sheet 24 made of a resin material is disposed between the flat wound electrode body and an inner periphery of the rectangular outer casing 25 except for the one side where the opening sealing member 23 is disposed. The rectangular outer casing 25 is made of, e.g., aluminum or an aluminum alloy. The opening sealing member 23 is fitted to an opening of the rectangular outer casing 25, and the opening sealing member 23 and the rectangular outer casing 25 fitted to each other are laser-welded at the interface between them. A nonaqueous electrolytic solution is filled into the rectangular outer casing 25 through an electrolytic solution filling port 26, and the electrolytic solution filling port 26 is closed by a blind rivet, for example.

In a variety of applications, the nonaqueous electrolyte secondary battery 10 is employed alone or plural in a state connected in series, parallel, or serial parallel. When the nonaqueous electrolyte secondary battery 10 is employed plural in a state connected in series or parallel in a vehicle, for example, the individual batteries are preferably connected to each other through bus bars by additionally disposing positive electrode external terminals and negative electrode external terminals.

The flat wound electrode body 14 or 14A used in the nonaqueous electrolyte secondary battery 10 is adapted for applications that require a high battery capacity of 20 Ah or more and a high output characteristic. For example, the number of windings of the positive electrode plate 11 is 43, namely the total number of laminated layers of the positive electrode plate 11 is as large as 86. It is to be noted that when the number of windings of the positive electrode plate 11 is 15 or more, namely when the total number of laminated layers thereof is 30 or more, the battery capacity of 20 Ah or higher can be easily obtained without increasing the battery size excessively.

When the total number of laminated layers in each of the positive electrode core exposed portion 15 and the negative electrode core exposed portion 16 is large as mentioned above, a large amount of welding current is needed to form welding marks 15a and 16a that penetrate through all the laminated layers of the positive electrode core exposed portion 15 and the negative electrode core exposed portion 16 each in the form of laminated multilayers, when the positive electrode current collector 17 and the negative electrode current collector 19 are joined respectively to the positive electrode core exposed portion 15 and the negative electrode core exposed portion 16 by resistance welding.

In view of the above-mentioned point, as illustrated in FIGS. 2A to 2C, on the side where the positive electrode plate 11 is led out, the wound and laminated multilayers of the positive electrode core exposed portion 15 are bundled toward a center in a thickness direction of the flat wound electrode body, and are divided into two groups. The two groups of the wound and laminated multilayers of the positive electrode core exposed portion 15 are each further bundled toward a position, as a center, distanced through ¼ of the thickness of the flat wound electrode body from one of both the surfaces thereof. A positive electrode intermediate member 30 is arranged between the two groups of the wound and laminated multilayers of the positive electrode core exposed portion 15. The positive electrode intermediate member 30 includes a base made of a resin material, and the base holds a plurality of, e.g., two, positive electrode conductive members 29 having electrical conductivity. Each of the positive electrode conductive members 29 is in the form of a circular column, for example, and it includes a conical prominence that acts as a projection and that is formed on the side facing the laminated multilayers of the positive electrode core exposed portion 15.

On the side where the negative electrode plate 12 is led out, the wound and laminated multilayers of the negative electrode core exposed portion 16 are bundled toward a center in a thickness direction of the flat wound electrode body, and are divided into two groups. The two groups of the wound and laminated multilayers of the negative electrode core exposed portion 16 are each further bundled toward a position, as a center, distanced through ¼ of the thickness of the flat wound electrode body from one of both the surfaces thereof. A negative electrode intermediate member 32 is arranged between the two groups of the wound and laminated multilayers of the negative electrode core exposed portion 16. The negative electrode intermediate member 32 includes a base made of a resin material, and the base holds a plurality of, two in the illustrated example, negative electrode conductive members 31. Each of the negative electrode conductive members 31 is in the form of a circular column, for example, and it includes a conical prominence that acts as a projection and that is formed on the side facing the laminated multilayers of the negative electrode core exposed portion 16.

The positive electrode current collector 17 is arranged in contact with each of outermost surfaces of the two laminated multilayer groups of the positive electrode core exposed portion 15, those two laminated multilayer groups being positioned on both the sides of each positive electrode conductive member 29, and the negative electrode current collector 19 is arranged in contact with each of outermost surfaces of the two laminated multilayer groups of the negative electrode core exposed portion 16, those two laminated multilayer groups being positioned on both the sides of each negative electrode conductive member 31. The positive electrode conductive member 29 is preferably made of the same material as that of the positive electrode core, i.e., aluminum or an aluminum alloy. The negative electrode conductive member 31 is preferably made of the same material as that of the negative electrode core, i.e., copper or a copper alloy. Shapes of the positive electrode conductive member 29 and the negative electrode conductive member 31 may be the same or different from each other.

A resistance welding method used for the positive electrode core exposed portion 15, the positive electrode current collector 17, and the positive electrode intermediate member 30 including the positive electrode conductive members 29, which constitute the flat wound electrode body 14 or 14A in the embodiment or the comparative example, and a resistance welding method used for the negative electrode core exposed portion 16, the negative electrode current collector 19, and the negative electrode intermediate member 32 including the negative electrode conductive members 31, which also constitute the flat wound electrode body 14 or 14A, are known in the art, and hence detailed description of those methods is omitted.

By dividing the laminated multilayers of each of the positive electrode core exposed portion 15 and the negative electrode core exposed portion 16 into two groups as mentioned above, a welding current required to form a welding mark penetrating through all the plural laminated multilayers per group in each of the positive electrode core exposed portion 15 and the negative electrode core exposed portion 16 is reduced in comparison with that required in the case where the laminated multilayers are not divided into the two groups. Accordingly, the occurrence of sputtering during the resistance welding is suppressed, and the occurrence of troubles caused by the sputtering, such as inner short-circuiting in the flat wound electrode body 14, is suppressed. FIG. 2A illustrates two welding marks 33 formed in the positive electrode current collector 17 by the resistance welding, and two welding marks 34 formed in the negative electrode current collector 19.

Practical production methods and compositions of the positive electrode plate 11, the negative electrode plate 12, the flat wound electrode body 14 or 14A, and the nonaqueous electrolytic solution in the nonaqueous electrolyte secondary battery 10 will be described below.

[Fabrication of Positive Electrode Plate]

A lithium nickel cobalt manganese compound oxide expressed by $LiNi_{0.35}Co_{0.35}Mn_{0.30}O_2$ was used as a positive electrode active material. Positive electrode mixture slurry was prepared by weighing the lithium nickel cobalt manganese compound oxide, carbon powder as a conductive agent, polyvinylidene fluoride (PVdF) as a binder, and lithium carbonate at a mass ratio of 87:9:3:1, and by mixing N-methyl-2-pyrrolidone (NMP) as a dispersion medium to the above ingredients.

Preferably, lithium carbonate is contained at a content of 0.1 to 5.0% by mass with respect to the positive electrode mixture. If the content of lithium carbonate in the positive electrode mixture is less than 0.1% by mass, an amount of carbon dioxide generated from the lithium carbonate would be reduced and the current interrupt mechanism would be hard to operate promptly. If the content of lithium carbonate in the positive electrode mixture is more than 5.0% by mass, a proportion of the lithium carbonate not taking part in the electrode reaction would be increased excessively, and a reduction of the battery capacity would be increased.

An aluminum foil having a thickness of 15 μm was used as the positive electrode core, and the positive electrode mixture slurry prepared as mentioned above was coated over both surfaces of the positive electrode core by a die coater. However, the slurry was not coated over one end portion of each surface of the positive electrode core to extend along a lengthwise direction thereof (the one end portions of both the surfaces being positioned in the same widthwise direction of the core) such that the core was exposed in each of those one end portions. Thus, the positive electrode core exposed portion 15 was formed. After drying the slurry and removing NMP as the dispersion medium, the positive electrode core was compressed by a roll press to have a predetermined thickness, and an obtained electrode plate was cut into a predetermined size. The positive electrode plate 11 used in common to the embodiment and the comparative example was fabricated in such a manner.

[Fabrication of Negative Electrode Plate]

The negative electrode plate was fabricated as follows. Negative electrode mixture slurry was prepared by dispersing, in water, 98 parts by mass of graphite powder, 1 part by mass of carboxymethyl cellulose (CMC) as a viscosity improver, and 1 part by mass of styrene-butadiene rubber (SBR) as a binder. The prepared negative electrode mixture slurry was coated over both surfaces of the negative electrode core made of a copper foil having a thickness of 10 μm. However, the slurry was not coated over one end portion of each surface of the die negative electrode core to extend along a lengthwise direction thereof (the one end portions of both the surfaces being positioned in the same widthwise direction of the core) such that the core was exposed in each of those one end portions. Thus, the negative electrode core exposed portion 16 was formed. After drying the slurry, the negative electrode core was compressed by a roll press to have a predetermined thickness, and an obtained electrode plate was cut into a predetermined size. The negative electrode plate 12 used in common to the embodiment and the comparative example was fabricated in such a manner.

[Preparation of Nonaqueous Electrolytic Solution]

The nonaqueous electrolytic solution was prepared by mixing two kinds of solvents, i.e., ethylene carbonate (EC) and methyl ethyl carbonate (MEC), at a volume ratio of 3:7 (25° C. and 1 atm) to obtain a mixture solvent, adding 1 mol/L of $LiPF_6$ as electrolytic salt to the mixture solvent, and further adding vinylene carbonate VC at a proportion of 0.3% by mass with respect to the total mass of the nonaqueous electrolyte.

[Fabrication of Flat Wound Electrode Body]

Figure 4A:
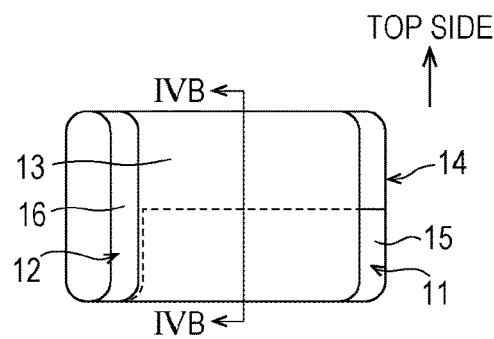
FIG. 4A is a perspective view of the flat wound electrode body in the embodiment.
Figure 4B:
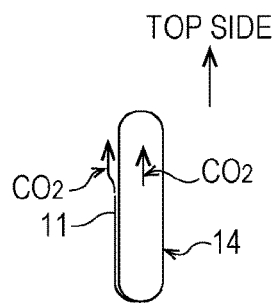
FIG. 4B is a schematic sectional view taken along a line IVB-IVB in FIG. 4A.
Figure 5A:
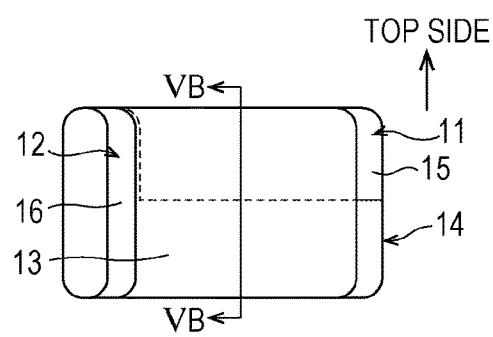
FIG. 5A is a perspective view of the flat wound electrode body in the comparative example.
Figure 5B:
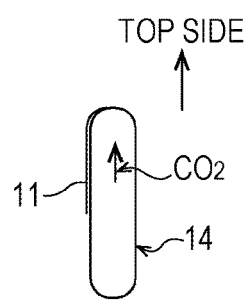
FIG. 5B is a schematic sectional view taken along a line VB-VB in FIG. 5A.

The flat wound electrode body 14 or 14A was fabricated by winding the negative electrode plate 12 and the positive electrode plate 11, each fabricated as described above, in a state where both the plates were insulated from each other with the separator 13 interposed therebetween while the negative electrode plate 12 is positioned on the outermost surface side, and then by shaping the wound electrode plates into a flat roll shape. FIG. 4A is a perspective view of the flat wound electrode body 14 of the embodiment, and FIG. 4B is a schematic sectional view taken along a line IVB-IVB in FIG. 4A. FIG. 5A is a perspective view of the flat wound electrode body 14A of the comparative example, and FIG. 5B is a schematic sectional view taken along a line VB-VB in FIG. 5A. It is to be noted that, in FIGS. 4B and 5B, the negative electrode plate and the separator on the outermost surface side are omitted.

Respective winding end-side edges of the negative electrode plate and the separator on the outermost surface side in the flat wound electrode body 14 of the embodiment are both directed toward the top side similarly to the positive electrode plate 11 illustrated in FIG. 4B. On the other hand, respective winding end-side edges of the negative electrode plate and the separator on the outermost surface side in the flat wound electrode body 14 of the comparative example are each directed downwards similarly to the positive electrode plate 11 illustrated in FIG. 5B.

[Overcharge Tests]

Nonaqueous electrolyte secondary batteries constituted as illustrated in FIGS. 1 and 2 were fabricated by employing the flat wound electrode body 14 of the embodiment and the wound electrode body 14A of the comparative example, each fabricated as described above, and overcharge tests were performed on the nonaqueous electrolyte secondary batteries. Charging was carried out as constant-current charge at a constant current of 1 It until a battery voltage reached 4.2 V. After the battery voltage had reached 4.2 V, constant-voltage charge was continued at a constant voltage of 4.2 V for 72 hours.

Neither smoking nor heat generation occurred in each of the nonaqueous electrolyte secondary battery of the embodiment and the nonaqueous electrolyte secondary battery of the comparative example. In the nonaqueous electrolyte secondary battery of the comparative example, however, it was confirmed that lateral surfaces of the battery in regions near the top side were bulged to a larger extent than those of the nonaqueous electrolyte secondary battery of the embodiment.

Such a phenomenon is presumably caused by the following reason. When lithium carbonate is contained in the positive electrode mixture layer, carbon dioxide ($CO_2$) generated from the positive electrode plate rises within the flat wound electrode body toward the top side. Then, the carbon dioxide accumulated on the top side within the flat wound electrode body moves along a direction of the winding axis of the flat wound electrode body, and further moves toward the outside of the flat wound electrode body.

When the carbon dioxide accumulates on the surface of the positive electrode mixture layer, a current does not flow in that surface, and hence an overcharge state disappears there. Accordingly, the generation of carbon dioxide from the above-mentioned surface is stopped, thus resulting in a possibility that the operation of a pressure-sensitive current interrupt mechanism may be delayed.

The winding end-side edges of the positive electrode plate, the negative electrode plate, and the separator on the outermost surface side are all directed toward the top side in the flat wound electrode body 14 of the embodiment, whereas those winding end-side edges are all directed downwards in the flat wound electrode body 14A of the comparative example. In the flat wound electrode body 14A of the comparative example, therefore, an amount of carbon dioxide accumulated within the flat wound electrode body is larger than that in the flat wound electrode body 14 of embodiment. Thus, it is thought that, in the nonaqueous electrolyte secondary battery of the comparative example, the lateral surfaces of the battery in the regions near the top side are bulged to a larger extent than those of the nonaqueous electrolyte secondary battery of the embodiment for the above-mentioned reason. In the nonaqueous electrolyte secondary battery using the flat wound electrode body 14 of the embodiment, the amount of carbon dioxide accumulated within the flat wound electrode body 14 is reduced. In other words, since an amount of carbon dioxide generated and moving toward the outside is increased, the pressure-sensitive current interrupt mechanism can be caused to operate promptly and reliably before the pressure inside the battery rises excessively, and very high safety can be ensured in the event of overcharge.

Additionally, a winding fixation tape may be bonded to a winding end portion of the separator, the winding end portion being positioned at an outermost periphery of the flat wound electrode body. In such a case, a gap is formed between the separator and the winding fixation tape due to the pressure of gas generated within the wound electrode body, and the gas is discharged to the outside of the wound electrode body through the gap.

The winding fixation tape is preferably prepared as a tape including an adhesive layer formed on the surface of a base material. The base material may be a film of, e.g., polyethylene terephthalate (PET), polybutylene terephthalate (PBT), polyethylene naphthalate (PEN), polyvinyl chloride, polypropylene (PP), polyarylate, polyurethane, polycarbonate, polyamide, polyimide (PI), polyphenylene sulfide (PPS), or polytetrafluoroethylene, or a film of a complex containing at least one of those examples. Above all, polypropylene, polyphenylene sulfide, or polyamide is preferably used. The adhesive layer may be formed by employing, e.g., a rubber-based adhesive, a silicone-based adhesive, an acrylic adhesive, or an acrylate-based adhesive. Above all, the acrylic adhesive or the rubber-based adhesive is preferably used.

The adhesive layer preferably has a property that adhesivity is reduced upon contacting a nonaqueous solvent contained in the nonaqueous electrolyte. With such a property, in a state where the wound electrode body is stored in the rectangular outer casing together with the nonaqueous electrolyte, the winding fixation tape is made more likely peel off from the wound electrode body. Accordingly, when gas is generated within the wound electrode body, the gas is easily discharged toward the top side from the wound electrode body without being impeded by the winding fixation tape. In the case of the adhesive layer being made of the rubber-based adhesive, the rubber-based adhesive is caused to swell upon contacting the nonaqueous solvent, and the winding fixation tape is brought into a state where the tape is easily peeled off from the wound electrode body. Thus, the rubber-based adhesive is most preferable as the adhesive layer.

The positive electrode active material usable in the nonaqueous electrolyte secondary battery of the present invention can be optionally selected from various compounds insofar as the compounds are able to reversibly occlude and release lithium ions. Lithium transition metal compound oxides expressed by $LiMO_2$ (M is at least one of Co, Ni and Mn) and being able to reversibly occlude and release lithium ions, i.e., $LiCoO_2$, $LiNiO_2$, $LiNi_yCo_{1-y}O_2$ (y=0.01 to 0.99), $LiMnO_2$, $LiCo_xMn_yNi_zO_2$ (x+y+z=1), $LiMn_2O_4$, and $LiFePO_4$, can be used as the positive electrode active material singularly or in a mixed state of two or more among them. In addition, a material obtained by adding a hetero metal element, e.g., zirconium, magnesium or aluminum, to a lithium cobalt compound oxide is also usable.

A solvent for the nonaqueous electrolyte is not limited to particular one, and it may be one of solvents that have been used so far in nonaqueous electrolyte secondary batteries. Examples of the solvents usable here include cyclic carbonates such as ethylene carbonate (EC), propylene carbonate (PC), butylene carbonate, and vinylene carbonate (VC); chain carbonates such as dimethyl carbonate (DMC), methyl ethyl carbonate (MEC), and diethyl carbonate (DEC); compounds each containing ester, such as methyl acetate, ethyl acetate, propyl acetate, methyl propionate, ethyl propionate, and γ-butyl lactone; compounds each containing a sulfone group, such as propane sultone; compounds each containing ether, such as 1,2-dimethoxyethane, 1,2-diethoxyethane, tetrahydrofuran, 1,2-dioxane, 1,4-dioxane, and 2-methyltetrahydrofuran; compounds each containing nitrile, such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and compounds each containing amide, such as dimethylformamide. In particular, solvents obtained by partly replacing H, which is contained in the above-mentioned solvents, with F are preferably used. The above-mentioned solvents can be used singularly or in combinations of the plural solvents. In particular, a solvent obtained by combining the cyclic carbonate and the chain carbonate with each other, or a solvent obtained by combining a compound containing a small amount of nitrile or a compound containing ether with the above combined solvent is preferable.

An ionic liquid can also be used as the nonaqueous solvent for the nonaqueous electrolyte. In such a case, the cationic species and the anionic species are not limited to particular ones. However, a combination using a pyridinium cation, an imidazolium cation, or a quarternary ammonium cation as the cationic species, and a fluorine-containing imide anion as the anionic species is particularly preferable from the viewpoint of low viscosity, electrochemical stability, and hydrophobic property.

A solute used in the nonaqueous electrolyte may be one or more of known lithium salts that have been generally used so far in nonaqueous electrolyte secondary batteries. Those lithium salts may be lithium salts containing one or more elements selected from among P, B, F, O, S, N and Cl. More specifically, lithium salts, such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$ $LiC(C_2F_5SO_2)_3$, $LiAsF_6$, $LiClO_4$ and $LiPF_2O_2$, and mixtures of the above lithium salts can be used optionally. In particular, $LiPF_6$ is preferably used from the viewpoint of improving high-rate charge and discharge characteristics and durability of the nonaqueous electrolyte secondary battery.

Lithium salts each containing an oxalato as an anion can also be used as the solute. The lithium salts each containing an oxalato as an anion may be not only LiBOB (lithium-bis(oxalato)borate), but also those lithium salts each containing an anion in which $C_2O_4^{2-}$ is coordinated as a central atom, e.g., lithium salts expressed by $Li[M(C_2O_4)_xR_y]$ (where M denotes an element selected from among transition metals and elements of 13, 14 and 15 groups in the periodic table, R denotes a group selected from among halogen, an alkyl group, and a halogen-substituted alkyl group, x denotes a positive integer, and y is 0 or a positive integer). Specific examples of those lithium salts are $Li[B(C_2O_4)F_2]$, $Li[P(C_2O_4)F_4]$, and $Li[P(C_2O_4)_2F_2]$. Above all, LiBOB is most preferably used in order to form a stable coating on the surface of the negative electrode even under a high-temperature environment.

The above-mentioned solutes may be used singularly or in a mixed state of two or more among them. Although a concentration of the solute is not limited to a particular value, the concentration is desirably in the range of 0.8-1.7 mol per liter of the nonaqueous electrolytic solution. In applications requiring discharge at a large current, the concentration of the solute is desirably in the range of 1.0-1.6 mol per liter of the nonaqueous electrolytic solution.

In the nonaqueous electrolyte secondary battery according to one aspect of the present invention, a negative electrode active material used in the negative electrode of the nonaqueous electrolyte secondary battery is not limited to particular one insofar as the material is able to reversibly occlude and release lithium ions. For example, a carbon material, a lithium metal, a metal or alloy material forming an alloy with lithium, and a metal oxide can be used optionally. From the viewpoint of the material cost, the carbon material is preferably used as the negative electrode active material. For example, natural graphite, artificial graphite, mesophase pitch-based carbon fibers (MCF), mesocarbon microbeads (MCMB), coke, and hard carbon are usable. In particular, a carbon material obtained by coating a graphite material with low crystallinity carbon is preferably used as the negative electrode active material from the viewpoint of improving the high-rate charge and discharge characteristics.

The separator can be made of a material that has been generally known and used so far in nonaqueous electrolyte secondary batteries. In practice, the separator may be made of polyethylene. An alternative material may be obtained by forming a layer of polypropylene on the surface of the separator made of polyethylene, or by coating an aramid-based resin over the surface of the separator made of polyethylene.

A layer containing inorganic filler, which has been used so far in the relevant art, may be formed at the interface between the positive electrode and the separator and the interface between the negative electrode and the separator. The filler may be one of oxides and phosphate compounds, which have been used so far in the relevant art, containing titanium, aluminum, silicon, and magnesium singularly or in combinations of two or more among those elements, or one of materials obtained by treating the surfaces of those oxides and phosphate compounds with, e.g., a hydroxide. The filler layer can be formed, for example, by a method of coating slurry, which contains the filler, directly over the positive electrode, the negative electrode, or the separator, or a method of bonding a sheet made of the filler to the positive electrode, the negative electrode, or the separator.

[Another Invention 1]

A nonaqueous electrolyte secondary battery according to another invention 1 includes:

a positive electrode plate including a positive electrode mixture layer formed on a positive electrode core;

a negative electrode plate including a negative electrode mixture layer formed on a negative electrode core;

a wound electrode body in which the positive electrode plate and the negative electrode plate are wound in a state insulated from each other with a separator interposed between the positive electrode plate and the negative electrode plate;

a nonaqueous electrolyte;

a pressure-sensitive current interrupt mechanism electrically connected to at least one of the positive electrode plate and the negative electrode plate; and an outer casing, wherein the positive electrode mixture layer contains lithium carbonate, and the nonaqueous electrolyte contains lithium bis(oxalato)borate ($Li[B(C_2O_4)_2]$).

In the nonaqueous electrolyte secondary battery, when charge and discharge are repeated, potentials at the positive electrode and the negative electrode become uneven due to an increase of resistance. Thus, after charge and discharge cycles, there is a possibility that the pressure-sensitive current interrupt mechanism may be hard to operate promptly even when the battery comes into an overcharge state, because the decomposition reaction of lithium carbonate becomes uneven.

In contrast, according to the other invention 1, since the nonaqueous electrolyte containing lithium bis(oxalato)borate (LiBOB) is used, a stable protective layer made of a lithium ion conduction layer, which is thin and very stable, is formed on the surface of the positive or negative electrode active material. With the presence of the protective layer, an increase of reaction resistance of the positive electrode plate is suppressed and unevenness of a potential distribution in the positive electrode plate is reduced even after the charge and the discharge have been repeated. Therefore, when the battery comes into the overcharge state, the lithium carbonate contained in the positive electrode plate is more apt to decompose evenly, and carbon dioxide is evenly generated from the entire surface of the positive electrode plate. As a result, the pressure-sensitive current interrupt mechanism can be caused to operate promptly and reliably before the pressure inside the battery rises excessively in the event of overcharge, and very high safety is ensured in the event of overcharge. In the other invention 1, orientations of the positive electrode plate, the negative electrode plate, and the separator in the winding end portion of the flat wound electrode body are not limited to particular directions.

A concentration of lithium carbonate in the positive electrode mixture layer is preferably not less than 0.1% by mass and not more than 5% by mass with respect to the mass of a positive electrode mixture. A content of LiBOB in the nonaqueous electrolyte is preferably not less than 0.5% by mass and not more than 3% by mass, more preferably not less than 2.2% by mass and not more than 3% by mass, with respect to the mass of the positive electrode mixture in a step of preparing the nonaqueous electrolyte.

In some cases, LiBOB is all consumed, though depending on an added amount, to form the protective film on the surface of the positive or negative electrode active material during an initial charge and discharge stage, and LiBOB is substantially not present in the nonaqueous electrolyte. Such a case is also involved in the present invention. Stated in another way, it is just required in the present invention that LiBOB is contained in the nonaqueous electrolyte in a state before performing the first charge in the nonaqueous electrolyte secondary battery.

[Reference Experiments]

Practical production methods and compositions of the positive electrode plates and the nonaqueous electrolytic solutions in respective nonaqueous electrolyte secondary batteries of Experimental Examples 1 to 6 will be described below. Constitutions in each of Experimental Examples 1 to 6 other than the positive electrode plate and the nonaqueous electrolyte are similar to those in the above-described embodiment and, therefore, description of those constitutions is omitted.

[Fabrication of Positive Electrode Plates]

(For Use in Experimental Examples 1 to 3 and 6)

Positive electrode mixture slurry was prepared by weighing a lithium nickel cobalt manganese compound oxide ($LiNi_{0.35}Co_{0.35}Mn_{0.30}O_2$), carbon powder as a conductive agent, and polyvinylidene fluoride (PVdF) as a binder at a mass ratio of 88:9:3, and by mixing N-methyl-2-pyrrolidone (NMP) as a dispersion medium to them. The positive electrode plate was fabricated by employing the prepared positive electrode mixture slurry in a similar manner to that in the above-described embodiment.

(For Use in Experimental Examples 4 and 5)

The positive electrode plate for use in each of Experimental Examples 4 and 5 was fabricated in a similar manner to that in Experimental Examples 1 to 3 and 6 except for the following point. In Experimental Examples 4 and 5, the positive electrode mixture slurry was prepared by weighing a lithium nickel cobalt manganese compound oxide ($LiNi_{0.35}Co_{0.35}Mn_{0.30}O_2$), carbon powder, and PVdF at a mass ratio of 88:9:3, adding 0.93% by mass of lithium carbonate with respect to the total mass of the above-mentioned components (i.e., the total mass of the positive electrode mixture), and further mixing NMP to them.

[Preparation of Nonaqueous Electrolytic Solutions]

(For Use in Experimental Examples 1 to 3)

A basic nonaqueous electrolytic solution was prepared by mixing two kinds of solvents, i.e., ethylene carbonate (EC) and methyl ethyl carbonate (MEC), at a volume ratio of 3:7 (25° C. and 1 atm) to obtain a mixture solvent, adding 1 mol/L of $LiPF_6$ as electrolyte salt to the mixture solvent, and further adding vinylene carbonate VC at a proportion of 0.3% by mass with respect to the total mass of the above-described components. The nonaqueous electrolytic solutions for use in Experimental Examples 1 to 3 were each prepared by adding, to the basic nonaqueous electrolytic solution, LiBOB at respective proportions of 1.8% by mass (Experimental Example 1), 2.2% by mass (Experimental Example 2), and 2.6% by mass with respect to the total mass of the positive electrode mixture.

(For Use in Experimental Examples 4 to 6)

The nonaqueous electrolytic solutions for use in Experimental Examples 4 to 6 were each prepared by adding, to the basic nonaqueous electrolytic solution, LiBOB at respective proportions of 0.99% by mass (Experimental Example 4), 0.89% by mass (Experimental Example 5), and 0.99 by mass (Experimental Example 6) with respect to the total mass of the positive electrode mixture. In the nonaqueous electrolytic solution for use in Experimental Example 6, cyclohexylbenzene (CHB) as an overcharge inhibitor was further added at a proportion of 2.98% by mass with respect to the total mass of the positive electrode mixture.

Experimental Examples 1 to 3

A preliminary experiment was performed at 25° C. under the following charge and discharge conditions by employing each of the rectangular nonaqueous electrolyte secondary batteries of Experimental Examples 1 to 3. In a state where each battery was charged with a charging current of 25 A at a room temperature of 25° C. until reaching 50% of state of charge, the battery was discharged for 10 sec at each of currents of 40 A, 80 A, 120 A, 160 A, 200 A, and 240 A, and a battery voltage was measured at each current. An output of the battery was then calculated from an I-V characteristic during the discharge, which was obtained by plotting each current value and the measured battery voltage. The state of charge having been deviated due to the discharge was returned to the original state of charge by charging the battery with a constant current of 25 A. The charge and the discharge were performed under conditions of 1 atm and 25° C. Then, pulse charge and discharge cycles of charging and discharging the battery at a current of not higher than 270 A for a period within 60 sec were performed until a total of the charging capacity and the discharging capacity exceeds 5000 Ah.

Thereafter, in the state where each battery was charged at the room temperature of 25° C. with the charging current of 25 A until reaching 50% of state of charge, the battery was discharged for 10 sec at each of currents of 40 A, 80 A, 120 A, 160 A, 200 A, and 240 A, and a battery voltage was measured at each current. An output of the battery was then calculated from an I-V characteristic during the discharge, which was obtained by plotting each current value and the measured battery voltage. On the basis of the initial output and the output after the cycles, which were obtained as described above, an output sustaining rate (%) after the cycles was determined from the following calculation formula. The determined result is indicated in Table 1 together with the content of LiBOB in the nonaqueous electrolytic solution.

Output sustaining rate after cycles (%)=(output after cycles/initial output)×100

TABLE 1

|  | LiBOB (% by mass)* | $Li_2CO_3$ | Output sustaining rate after cycles (%) |
|---|---|---|---|
| Experimental Example 1 | 1.8 | none | 74 |
| Experimental Example 2 | 2.2 | none | 78 |
| Experimental Example 3 | 2.6 | none | 78 |

*Value with respect to the total mass of the positive electrode mixture

Table 1 indicates the output sustaining rate after the cycles in the case where LiBOB is contained in the nonaqueous electrolytic solution while lithium carbonate serving as an overcharge inhibitor is not contained in the positive electrode mixture. As seen from the results listed in Table 1, the output sustaining rate after the cycles is lowest, i.e., 74%, in Experimental Example 1 in which the content of LiBOB in the nonaqueous electrolytic solution is as low as 1.8% by mass, while the output sustaining rate after the cycles takes a good value of 78% in Experimental Examples 2 and 3 in which the content of LiBOB in the nonaqueous electrolytic solution is not less than 2.2% by mass. It is thought that, with addition of LiBOB to the nonaqueous electrolytic solution, an increase of reaction resistance of the positive electrode plate is suppressed even after the charge and the discharge have been repeated. It is hence thought that unevenness of a potential distribution in the positive electrode plate is reduced even after the charge and the discharge have been repeated, and that if lithium carbonate is contained in the positive electrode plate, the lithium carbonate is more apt to decompose evenly and carbon dioxide is evenly generated from the entire surface of the positive electrode plate.

Experimental Examples 4 to 6

A first overcharge test and a second overcharge test were performed under the following charge and discharge conditions by employing each of the rectangular nonaqueous electrolyte secondary batteries of Experimental Examples 4 to 6. In the first overcharge test, each battery was charged at 25° C. and at a constant current of 1 It until the battery voltage reached 4.2 V. After the battery voltage had reached 4.2 V, the charge was continued at a constant voltage of 4.2 V for 72 hours. A quantity of electricity flowing in the first overcharge test (i.e., charging capacity) was expressed as a relative value with the result of Experimental Example 4 being 100%. In the second overcharge test, the occurrence of smoking and generation of heat were checked only for the rectangular nonaqueous electrolyte secondary batteries of Experimental Examples 4 and 5 by performing constant-current charge at 25° C. and at a constant current of 1 It until the battery voltage reached 30 V. The obtained results are listed in Table 2.

TABLE 2

|  | $Li_2CO_3$ (% by mass)* | CHB (% by mass)* | LiBOB (% by mass)* | Result of First Overcharge Test** | Result of Second Overcharge Test** |
|---|---|---|---|---|---|
| Experimental Example 4 | 0.93 | none | 0.99 | 100 | neither smoking nor generation of heat |
| Experimental Example 5 | 0.93 | none | 0.89 | 100 | neither smoking nor generation of heat |
| Experimental Example 6 | none | 2.98 | 0.99 | 318 | — |

*Value with respect to the total mass of the positive electrode mixture
**Relative value with respect to the result of Experimental Example 4

The following points are understood from the results listed in Table 2. The first overcharge tests performed on the rectangular nonaqueous electrolyte secondary batteries of Experimental Examples 4 and 5 show that, when the constant-voltage charge at 4.2 V is continued, both the batteries come into a fully charged state and the charging current is converged to substantially "0". This means that the charging current is not consumed by a side reaction and it is not used to decompose the lithium carbonate serving as the overcharge inhibitor.

On the other hand, in the first overcharge test performed on the rectangular nonaqueous electrolyte secondary battery of Experimental Example 6, when the constant-voltage charge at 4.2 V is continued, the charging capacity reaches 3.18 times (318%) the value in the rectangular nonaqueous electrolyte secondary battery of Experimental Example 4. Such a result means that, in the rectangular nonaqueous electrolyte secondary battery of Experimental Example 6, the charging current is consumed by a side reaction and it continues to flow even after the battery has come into the fully charged state. Thus, it is thought that, in the rectangular nonaqueous electrolyte secondary battery of Experimental Example 6, because CHB serving as the overcharge inhibitor is added into the nonaqueous electrolytic solution, the charging current flowing even after reaching the fully charged state is consumed by a decomposition reaction of CHB.

Furthermore, as seen from the results of the second overcharge tests performed on the rectangular nonaqueous electrolyte secondary batteries of Experimental Examples 4 and 5, the current interrupt mechanism operates, and neither smoking nor generation of heat do not occur in both the batteries. Such a result means that, by employing the battery in which lithium carbonate is contained in the positive electrode mixture layer and LiBOB is added as the nonaqueous electrolyte in a manufacturing process, the current interrupt mechanism can be caused to operate promptly and reliably before the pressure inside the battery rises excessively in the event of overcharge, and very high safety is ensured in the event of overcharge.

[Still Another Invention 2]

A nonaqueous electrolyte secondary battery according to still another invention 2 includes:

a positive electrode plate including a positive electrode mixture layer formed on a positive electrode core;

a negative electrode plate including a negative electrode mixture layer formed on a negative electrode core;

a wound electrode body in which the positive electrode plate and the negative electrode plate are wound in a state insulated from each other with a separator interposed between the positive electrode plate and the negative electrode plate;

a nonaqueous electrolyte;

a pressure-sensitive current interrupt mechanism electrically connected to at least one of the positive electrode plate and the negative electrode plate; and an outer casing, wherein the positive electrode mixture layer contains lithium carbonate, and the nonaqueous electrolyte contains lithium difluorophosphate.

According to the still other invention 2, since the nonaqueous electrolyte containing lithium difluorophosphate is used, the lithium difluorophosphate reacts with lithium during the initial charge and discharge stage, and a good protective coating is formed on the surfaces of the positive electrode plate and the negative electrode plate. The protective coating acts to reduce reaction resistance of the positive electrode, and to make even a potential of the positive electrode. As a result, an output characteristic is improved. Moreover, the pressure-sensitive current interrupt mechanism can be caused to operate promptly and reliably before the pressure inside the battery rises excessively in the event of overcharge, and very high safety is ensured in the event of overcharge. In the still other invention 2, orientations of the positive electrode plate, the negative electrode plate, and the separator in the winding end portion of the flat wound electrode body are not limited to particular directions.

[Reference Experiments]

Practical production methods and compositions of the positive electrode plates and the nonaqueous electrolytic solutions in respective nonaqueous electrolyte secondary batteries of Experimental Examples 7 to 9 will be described below. Constitutions in each of Experimental Examples 7 to 9 other than the positive electrode plate and the nonaqueous electrolyte are similar to those in the above-described embodiment and, therefore, description of those constitutions is omitted.

[Fabrication of Positive Electrode Plates]

(For Use in Experimental Examples 7 to 9)

The positive electrode plates were fabricated in a similar manner to that in Experimental Examples 1 to 3 and 6.

[Preparation of Nonaqueous Electrolytic Solution]

(For Use in Experimental Example 7)

The nonaqueous electrolytic solution for use in Experimental Example 7 was prepared by mixing two kinds of solvents, i.e., ethylene carbonate (EC) and methyl ethyl carbonate (MEC), at a volume ratio of 3:7 (25° C. and 1 atm) to obtain a mixture solvent, adding 1 mol/L of $LiPF_6$ as electrolytic salt to the mixture solvent, and further adding vinylene carbonate VC at a proportion of 0.3% by mass with respect to the total mass of the nonaqueous electrolyte.

(For Use in Experimental Examples 8 and 9)

The nonaqueous electrolytic solutions for use in Experimental Examples 8 and 9 were each prepared by further adding, to the nonaqueous electrolytic solution for use in Experimental Example 7, lithium difluorophosphate at respective proportions of 0.62% by mass (Experimental Example 8) and 1.24% by mass (Experimental Example 9) with respect to the total mass of the positive electrode mixture.

Experimental Examples 7 to 9

A preliminary experiment was performed at 25° C. under the following charge and discharge conditions by employing each of the rectangular nonaqueous electrolyte secondary batteries of Experimental Examples 7 to 9. In a state where each battery was charged with a charging current of 25 A at a room temperature of 25° C. until reaching 50% of state of charge, the battery was discharged for 10 sec at each of currents of 40 A, 80 A, 120 A, 160 A, 200 A, and 240 A, and a battery voltage was measured at each current. An output of the battery was then calculated from an I-V characteristic during the discharge, which was obtained by plotting each current value and the measured battery voltage. The state of charge having been deviated due to the discharge was returned to the original state of charge by charging the battery with a constant current of 25 A. The charge and the discharge were performed under conditions of 1 atm and 25° C. The obtained results are listed in Table 3 together with the contents of lithium difluorophosphate in the nonaqueous electrolytic solution.

TABLE 3

| | $LiPF_2O_2$ (% by mass)* | $Li_2CO_3$ | Output at 25° C. (%)** |
|---|---|---|---|
| Experimental Example 7 | 0 | none | 100 |
| Experimental Example 8 | 0.62 | none | 109 |
| Experimental Example 9 | 1.24 | none | 113 |

*Value with respect to the total mass of the positive electrode mixture
**Relative value with respect to the result of Experimental Example 1

Table 3 indicates the output characteristic at ordinary temperature in the case where lithium difluorophosphate is contained in the nonaqueous electrolytic solution while lithium carbonate serving as an overcharge inhibitor is not contained in the positive electrode mixture. As seen from the results listed in Table 3, the output characteristic is lowest in Experimental Example 7 in which lithium difluorophosphate is not contained in the nonaqueous electrolytic solution, and the output characteristic is improved as an amount of lithium difluorophosphate added to the nonaqueous electrolytic solution increases. The above results can be thought as meaning that the reaction resistance of at least the positive electrode is reduced with addition of lithium difluorophosphate to the nonaqueous electrolytic solution. It is hence thought that unevenness of a potential distribution in the positive electrode plate is reduced, and that if lithium carbonate is contained in the positive electrode plate, the lithium carbonate is more apt to decompose evenly and carbon dioxide is evenly generated from the entire surface of the positive electrode plate.

The content of lithium difluorophosphate is preferably not less than 0.1% by mass and not more than 2% by mass with respect to the mass of the positive electrode mixture in the stage of preparing the nonaqueous electrolyte.

[Others]

The embodiment, the other invention 1, and the still other invention 2 have been each described above in connection with the nonaqueous electrolyte secondary battery including the pressure-sensitive current interrupt mechanism. In the present invention disclosed in this application, the nonaqueous electrolyte secondary battery may be modified into a form including a pressure-sensitive forced short-circuiting mechanism instead of the pressure-sensitive current interrupt mechanism.

Figure 6:
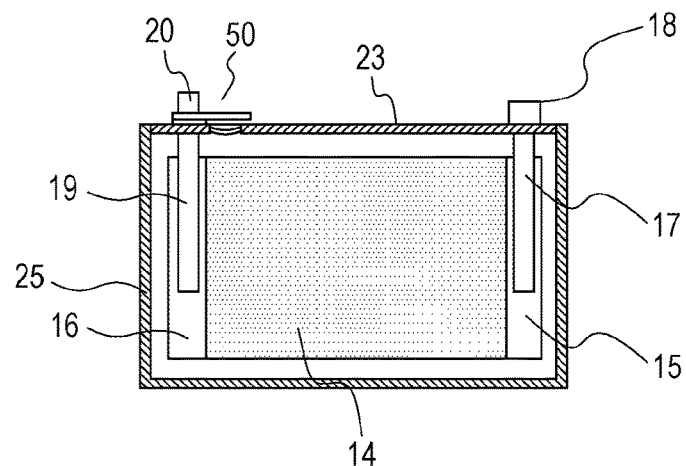
FIG. 6 is a sectional view of the nonaqueous electrolyte secondary battery including a forced short-circuiting mechanism.
Figure 7A:
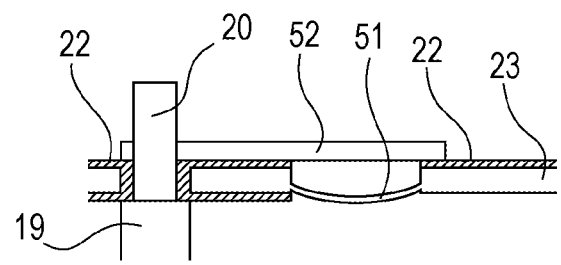
FIG. 7A illustrates a state before the operation of the forced short-circuiting mechanism.

As illustrated in FIG. 6, the forced short-circuiting mechanism is preferably disposed in the opening sealing member 23 near the negative electrode terminal 20. FIG. 7 is an enlarged view of a portion where the forced short-circuiting mechanism 50 of FIG. 6 is disposed. FIG. 7A illustrates a state before the operation of the forced short-circuiting mechanism 50, and FIG. 7B illustrates a state after the operation of the forced short-circuiting mechanism 50.

As illustrated in FIG. 7A, the opening sealing member 23 made of a metal includes a valve portion 51 electrically connected to the positive electrode plate 11, and a plate-shaped conductive member 52 arranged on the outer side of the valve portion 51 and electrically connected to the negative electrode plate 12. The valve portion 51 is made of a metal, and it may be formed integrally with the opening sealing member 23. As an alternative, the valve portion 51 may be provided separately from the opening sealing member 23 and may be connected to the opening sealing member 23. In the illustrated example, the conductive member 52 is connected to the negative electrode terminal 20 and is further electrically connected to the negative electrode plate 12 through the negative electrode current collector 19. The conductive member 52, the negative electrode terminal 20, and the negative electrode current collector 19 are all electrically insulated from the opening sealing member 23 by the insulating member 22.

Figure 7B:
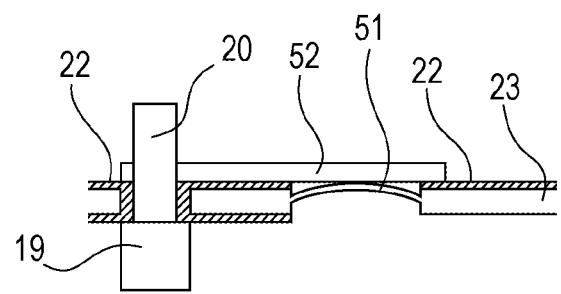
FIG. 7B illustrates a state after the operation of the forced short-circuiting mechanism.

When the battery comes into the overcharge state and the pressure inside the battery rises above a predetermined value, as illustrated in FIG. 7B, the valve portion 51 is deformed outwards (upwards in FIG. 7B) and is contacted with the conductive member 52. Since the metal-made valve portion 51 is electrically connected to the positive electrode plate 11 and the conductive member 52 is electrically connected the negative electrode plate 12, the positive electrode plate 11 and the negative electrode plate 12 are brought into a short-circuited state upon the contact between the valve portion 51 and the conductive member 52. As a result, the charging current can be prevented from flowing into the electrode body. Moreover, energy within the electrode body can be released quickly. Thus, safety can be ensured when the battery comes into the overcharge state.

REFERENCE SIGNS LIST

10 . . . nonaqueous electrolyte secondary battery 11 . . . positive electrode plate 11a . . . positive electrode mixture layer 12 . . . negative electrode plate 12a . . . negative electrode mixture layer 13 . . . separator 14, 14A . . . flat wound electrode body 15 . . . positive electrode core exposed portion 15a . . . welding mark 16 . . . negative electrode core exposed portion 17 . . . positive electrode current collector 18 . . . positive electrode terminal 19 . . . negative electrode current collector 20 . . . negative electrode terminal 21, 22 . . . insulating members, 23 . . . opening sealing member 24 . . . insulating sheet 25 . . . rectangular outer casing 26 . . . electrolytic solution filling port 27 . . . current interrupt mechanism 28 . . . gas discharge valve 29 . . . positive electrode conductive member, 30 . . . positive electrode intermediate member, 31 . . . negative electrode conductive member, 32 . . . negative electrode intermediate member, 33, 34 . . . welding marks 50 . . . forced short-circuiting mechanism 51 . . . valve portion 52 . . . conductive member

The invention claimed is:

1. A nonaqueous electrolyte secondary battery comprising:
a positive electrode plate including a positive electrode mixture layer formed on a positive electrode core;
a negative electrode plate including a negative electrode mixture layer formed on a negative electrode core;
a flat wound electrode body in which the positive electrode plate and the negative electrode plate are wound into a flat roll shape in a state insulated from each other with a separator interposed between the positive electrode plate and the negative electrode plate;
a nonaqueous electrolyte; and
an outer casing that has an opening and a sealing member to seal the opening,
wherein a positive electrode core exposed portion is formed in a form of wound multilayers in one end portion of the flat wound electrode body,
a negative electrode core exposed portion is formed in a form of wound multilayers in the other end portion of the flat wound electrode body,
the wound multilayers of the positive electrode core exposed portion are bundled and connected to a positive electrode current collector,
the wound multilayers of the negative electrode core exposed portion are bundled and connected to a negative electrode current collector,
the nonaqueous electrolyte secondary battery includes a pressure-sensitive current interrupt mechanism electrically connected to at least one of the positive electrode current collector and the negative electrode current collector,
the pressure-sensitive current interrupt mechanism is located closer to the opening than the flat wound electrode body,
the positive electrode mixture layer contains lithium carbonate,
the flat wound electrode body is inserted in the outer casing with a winding axis of the flat wound electrode body arranged to extend in a horizontal direction, and
a winding end edge of the positive electrode plate, a winding end edge of the negative electrode plate, and a winding end edge of the separator are all directed toward the sealing member.

2. The nonaqueous electrolyte secondary battery according to claim 1, wherein a concentration of lithium carbonate in the positive electrode mixture layer is not less than 0.1% by mass and not more than 5% by mass with respect to mass of a positive electrode mixture.

3. The nonaqueous electrolyte secondary battery according to claim 1, wherein the outer casing has a rectangular shape.

4. The nonaqueous electrolyte secondary battery according to claim 1, wherein the nonaqueous electrolyte contains lithium bis(oxalato)borate ($Li[B(C_2O_4)_2]$).

5. The nonaqueous electrolyte secondary battery according to claim 1, wherein the nonaqueous electrolyte contains lithium difluorophosphate.

6. A nonaqueous electrolyte secondary battery comprising:
a positive electrode plate including a positive electrode mixture layer formed on a positive electrode core;
a negative electrode plate including a negative electrode mixture layer formed on a negative electrode core;
a flat wound electrode body in which the positive electrode plate and the negative electrode plate are wound into a flat roll shape in a state insulated from each other with a separator interposed between the positive electrode plate and the negative electrode plate;
a nonaqueous electrolyte; and
an outer casing that has an opening and a sealing member to seal the opening, wherein a positive electrode core exposed portion is formed in a form of wound multilayers in one end portion of the flat wound electrode body, a negative electrode core exposed portion is formed in a form of wound multilayers in the other end portion of the flat wound electrode body, the wound multilayers of the positive electrode core exposed portion are bundled and connected to a positive electrode current collector, the wound multilayers of the negative electrode core exposed portion are bundled and connected to a negative electrode current collector, the nonaqueous electrolyte secondary battery includes a pressure-sensitive forced short-circuiting mechanism, the pressure-sensitive forced short-circuiting mechanism is located closer to the opening than the flat wound electrode body, the positive electrode mixture layer contains lithium carbonate, the flat wound electrode body is inserted in the outer casing with a winding axis of the flat wound electrode body arranged to extend in a horizontal direction, and a winding end edge of the positive electrode plate, a winding end edge of the negative electrode plate, and a winding end edge of the separator are all directed toward the sealing member.

7. The nonaqueous electrolyte secondary battery according to claim 6, wherein a concentration of lithium carbonate in the positive electrode mixture layer is not less than 0.1% by mass and not more than 5% by mass with respect to mass of a positive electrode mixture.

8. The nonaqueous electrolyte secondary battery according to claim 6, wherein the outer casing has a rectangular shape.

9. The nonaqueous electrolyte secondary battery according to claim 6, wherein the nonaqueous electrolyte contains lithium bis(oxalato)borate ($Li[B(C_2O_4)_2]$).

10. The nonaqueous electrolyte secondary battery according to claim 6, wherein the nonaqueous electrolyte contains lithium difluorophosphate.

11. The nonaqueous electrolyte secondary battery according to claim 6, wherein the pressure-sensitive forced short-circuiting mechanism is disposed on the sealing member.

12. The nonaqueous electrolyte secondary battery according to claim 11, wherein the pressure-sensitive forced short-circuiting mechanism includes a valve portion electrically connected to the positive electrode plate, and a plate-shaped conductive member arranged on an outer side of the valve portion and electrically connected to the negative electrode plate.

* * * * *